Figure 1:
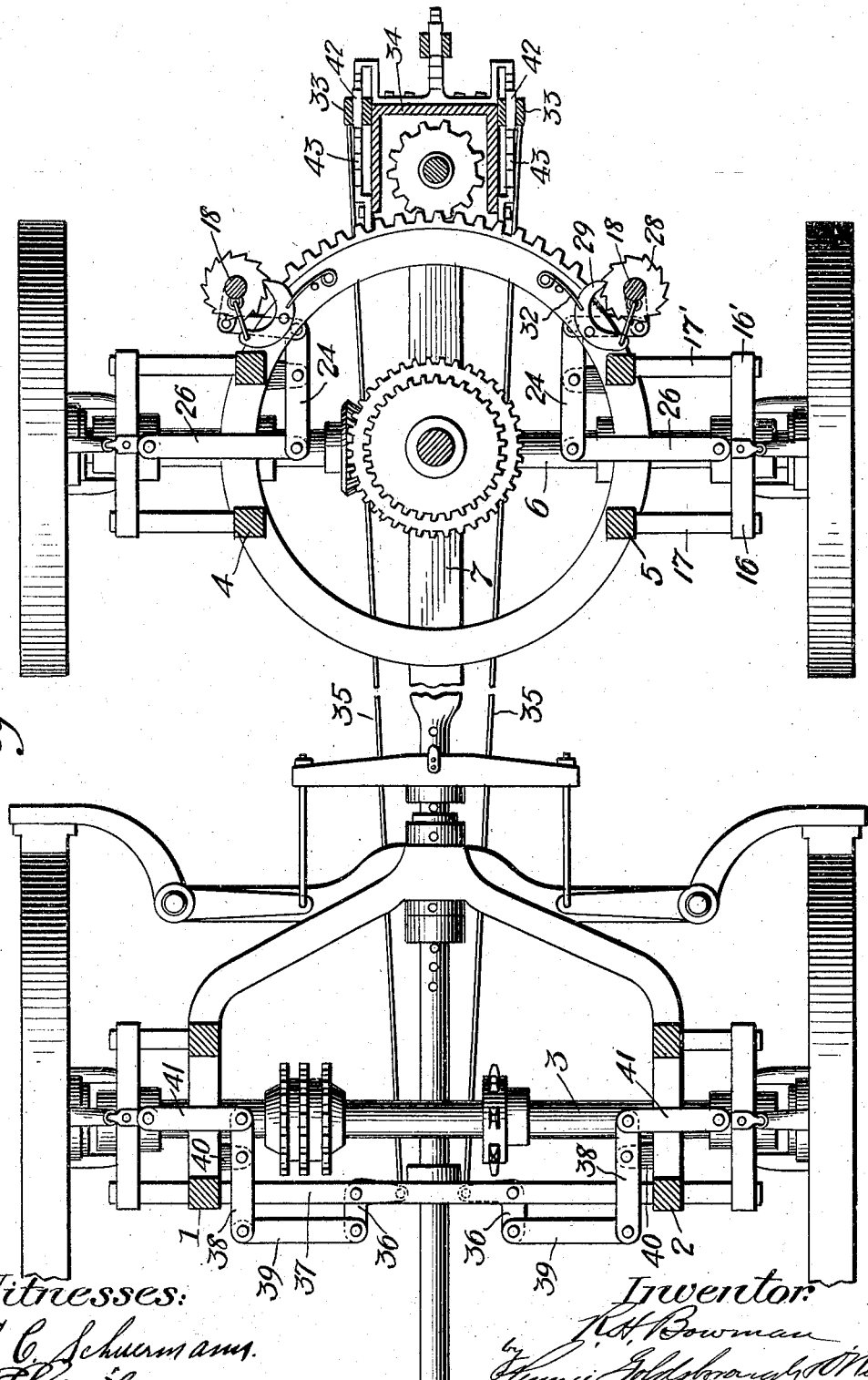

R. H. BOWMAN.
CLUTCH MECHANISM FOR MOTOR VEHICLES.
APPLICATION FILED MAY 5, 1908.

923,938.

Patented June 8, 1909.

3 SHEETS—SHEET 1.

Witnesses:
Inventor:

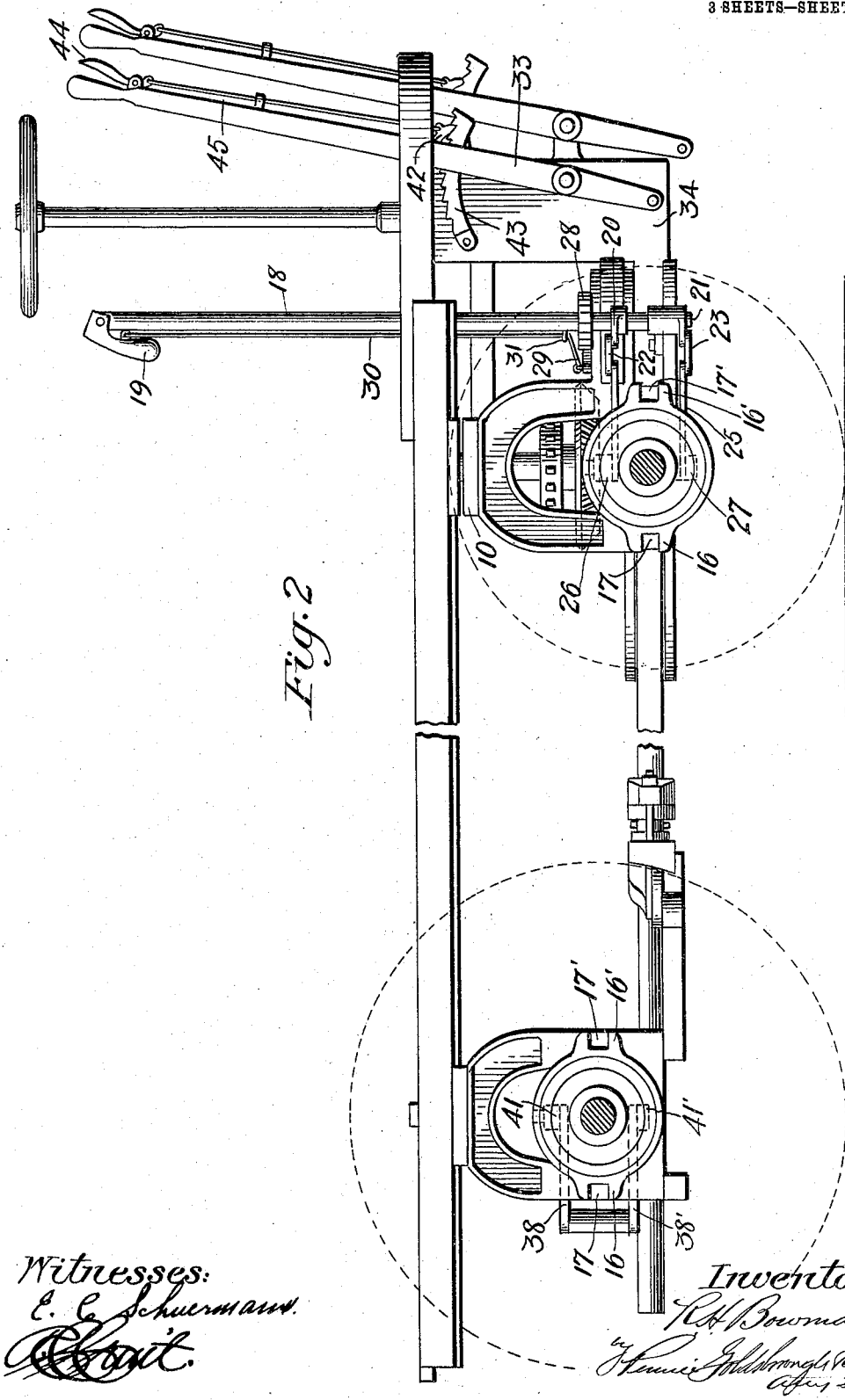

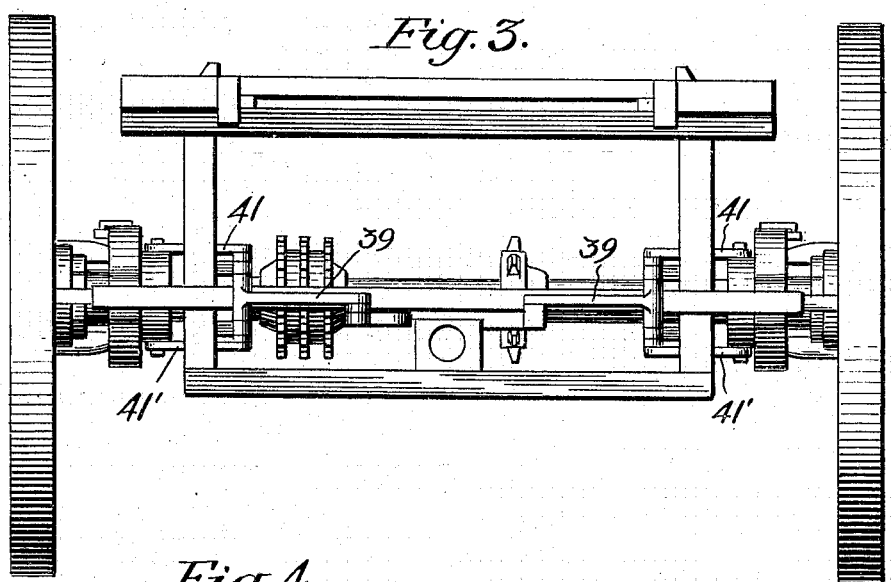
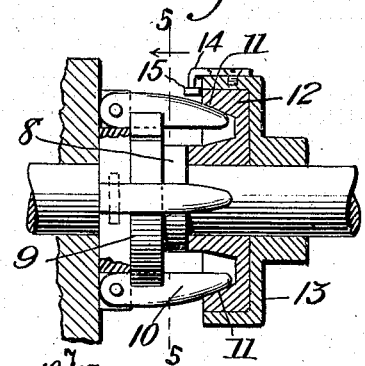
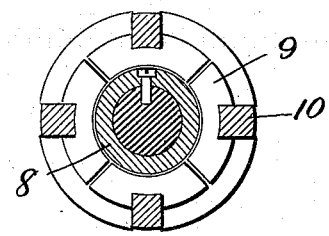
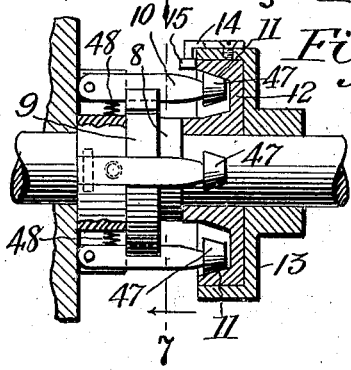
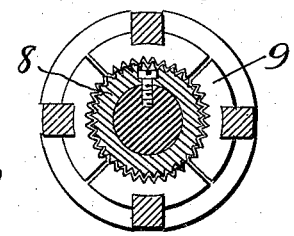
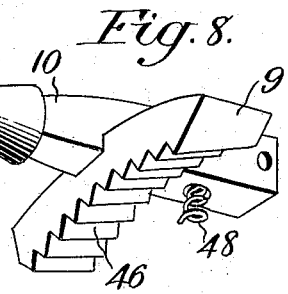

UNITED STATES PATENT OFFICE.

ROBERT HENRY BOWMAN, OF CANON CITY, COLORADO.

CLUTCH MECHANISM FOR MOTOR-VEHICLES.

No. 923,938.  Specification of Letters Patent.  Patented June 8, 1909.

Original application filed October 30, 1907, Serial No. 399,908. Divided and this application filed May 5, 1908. Serial No. 430,936.

*To all whom it may concern:*

Be it known that I, ROBERT HENRY BOWMAN, a citizen of the United States, residing at Canon City, in the county of Fremont and State of Colorado, have invented certain new and useful Improvements in Clutch Mechanism for Motor-Vehicles; and I do hereby declare the following to be a full, clear, and exact description of the invention, such as will enable others skilled in the art to which it appertains to make and use the same.

The invention, which is a division of my application for motor vehicle, filed October 30, 1907, Serial No. 399,908 relates to improvements in motor vehicles, the principal object being to provide a suitable clutch mechanism whereby the motive power of the vehicle may be applied directly to all of the four wheels of said vehicle. Such construction is advantageous and important for the reason that it makes available the entire tractive efficiency of the four ground wheels, and also enables the vehicle to be completely controlled.

With this and other objects in view, the invention consists in certain novel details of construction and combination and arrangement of parts, all as will now be described and the particular features of novelty pointed out in the appended claims.

In the drawings:—Figure 1 is a plan view of the motor vehicle with the body thereof removed, illustrating my improved wheel-clutch and operating mechanism therefor. Fig. 2 is a side elevation thereof. Fig. 3 is a rear elevation of the same. Fig. 4 is a longitudinal sectional view of one of the clutches. Fig. 5 is a sectional view of the same taken on the line 5—5 of Fig. 4. Fig. 6 is a sectional view of a modified form of clutch. Fig. 7 is a sectional view of the same taken on line 7—7 of Fig. 6 and, Fig. 8 is a perspective view of the clutch shoe shown in Figs. 6 and 7.

The vehicle illustrated is shown as having two truck frames and a body frame. The rear truck-frame is formed of two standards 1 and 2 within which the rear axle 3 is journaled, and the forward truck frame is likewise constructed with two standards 4 and 5 also having suitable bearings for the forward axle 6. The two truck-frames are suitably connected together by a reach bar 7 which is adjustably connected to the rear truck for the purpose of positioning the said trucks at the proper distance apart. As has been stated, both the forward and rear axles are journaled in their respective truck-frames, and power is transmitted from any suitable motor carried by the vehicle to either of said axles, or if desired, power may be applied to both the axles of the vehicle at the same time, thus giving the vehicle greater power of traction. Each of the vehicle wheels is loosely journaled upon its respective axle, and is adapted to be clutched thereto, when desired, by suitable clutching devices to be now described. All of the clutches are similarly constructed and it will therefore only be necessary to make reference in detail to but one of them.

The simplest form of my improved type of wheel clutch is illustrated in detail in Figs. 4 and 5 of the drawings, and consists of a clutch sleeve 8 which is keyed or otherwise secured to the axle, and is preferably beveled upon its rim. Pivoted to the hub of the vehicle wheel are suitable clutch shoes 9, and the same are provided with fingers 10 which extend in a direction substantially parallel with the axle and are adapted to be engaged by the beveled face 11 of a sliding cam-ring 12 in applying the clutch shoes to the beveled face of the clutch sleeve 8. The cam-ring 12 is so mounted upon the axle, that it not only has a sliding movement on said axle, but is capable of rotating therewith when the vehicle wheel is in clutched position. For the purpose of giving to the cam-ring 12 its sliding movement, said ring is detachably secured to a cup-shaped member 13 which is adapted to be operated by means of certain lever mechanism controlled from the forward part of the vehicle and which will be hereinafter described in detail. The sliding cam-ring 12 is held within the cup-shaped member by means of the retaining devices 14, which have antifriction rollers 15 engaging the cam-ring upon its outer edge as clearly shown in Figs. 4 and 6. The cup-shaped member 13 also has a sliding movement on the driving axle, and is provided with forked members 16, 16', which embrace the outwardly extending guides 17, 17', formed on the truck standards. In this manner the cup-shaped member has a sliding movement on the axle and the guide pieces 17, and 17', but is not permitted to rotate with the operating cam-ring 12.

The means for operating the two clutches for the forward wheels are similar in construction, and will now be described. In each instance, a vertical post 18 is provided, the same being adapted to be rotated within its bearing by means of a hand lever 19, which is pivoted to the upper end of said vertical post for the purpose to be presently set forth. Securely fastened to the end of the vertical post, at different heights thereon, are the short crank arms 20 and 21 which are connected by links 22 and 23 to levers 24 and 25 respectively, said levers 24 and 25 being pivoted to the frame-work of the forward truck and adapted to move in a horizontal direction to apply the clutches, links 26 and 27 being provided for connecting the cup-shaped member 13 with said levers 24 and 25. It is to be noted that the lever mechanism is duplicated as above described so that an even pull upon the clutch mechanism will be had, the same being connected to the cup-shaped member at opposite points above and below the axle.

For holding the clutches in applied position, a pawl and ratchet device is used, the same consisting of a ratchet wheel 28 fixed to the vertical post 18, and a spring pawl 29 pivoted to the frame-work of the forward truck and adapted to normally engage the teeth of the ratchet wheel. A flexible connection 30 is attached to the spring pawl and passes through an eye 31 formed at the lower end of the vertical post, and thence extend along the post to the pivoted hand lever 19 to which it is attached. When the hand lever 19 is in its lowered position the spring pawl is in engagement with the teeth of the ratchet wheel, it being held in this position by means of the spring indicated at 32, but when lifted to a position substantially at right angles to the vertical post 18, the pawl will be disconnected from the ratchet teeth, and the post may then be rotated to operate the clutch. Said clutch being moved to proper position, the hand lever may then be again lowered whereby the spring pawl will engage its ratchet teeth to hold the clutch in adjusted position.

The operating mechanism for the rear wheel clutches, while similar in many respects to the mechanism just described, is, however, somewhat differently arranged. These clutches are operated by the levers 33 which are pivotally attached to the steering post casing 34 and have connected to their lower ends a pull rod 35 which is secured at its other end to a single bell-crank lever 36. This bell-crank lever 36 is pivoted to a crosspiece 37 extending from one standard to the other and supported thereby, the said bell-crank lever being connected to two levers 38 and 38' by means of the link 39 as clearly shown in Figs. 1 and 3 of the drawings. These levers 38 and 38' are pivoted to the projections 40 formed on the inner side of the standard, and are adapted to be moved in a horizontal direction for applying the clutches of the rear wheels of the vehicle, said levers being connected to the cup-shaped member 13 by means of the links 41 and 41', similar to the lever mechanism heretofore described with reference to the forward wheel clutches. For the purpose of holding these clutches in applied position the operating levers 33 are provided with spring pawls 42 which engage a curved ratchet bar 43 secured to the steering post casing. A hand lever 44 is pivotally secured to the upper end of the operating lever 33 and is connected to the spring pawl 42 by means of the wire pull rod 45, whereby when the hand lever is operated, the pawl may be lifted from its ratchet bar, and the lever 33 operated for applying the clutches.

In Figs. 6, 7 and 8 I have illustrated a modified form of clutch, in which the clutch shoes are shown as having a serrated bearing face 46 which is adapted to engage a similar face on the clutch sleeve 8, thus permitting the vehicle wheels to be securely locked in place upon their respective axles when the clutches are in applied position. In this form of clutch I have also provided an anti-friction roller 47 upon the outer end of each of the fingers 10, said anti-friction rollers adapted to be engaged by the cam-ring 12 when the parts are in clutched position. In this construction of clutch shoes, I have provided means for releasing said shoes from the clutch sleeve after the cam-ring has been withdrawn from the fingers of said shoe, and for this purpose, a spring of any preferred form, such for instance as indicated at 48 is secured to the inside of each of the pivoted shoes and adapted to be compressed against a portion of the wheel hub when said shoes are moved into clutched position, thus serving when released to lift the shoes from the clutch sleeve.

What I claim is:—

1. In a motor vehicle, the combination with a driving axle and the loosely mounted ground wheels thereon, of clutch members pivoted to the ground wheels and extending inwardly along the axle, clutch sleeves on the axle within said pivoted clutch members, and means engaging the free ends of said pivoted members to force them inwardly into engagement with the said sleeve.

2. In a motor vehicle, the combination with a driving axle and the loosely mounted ground wheels thereon, of clutch members pivoted to the ground wheels and extending inwardly along the axle, a clutch sleeve secured to the axle within said pivoted members, a cam sliding on and turning with the axle and engaging the inner ends of the said pivoted members to force them inwardly into clutching contact with said sleeve.

3. In a motor vehicle, the combination with a driving axle and a ground wheel loose thereon and provided with a fixed clutch sleeve, of pivoted clutch members on said wheel and extending inwardly around said sleeve, a cam ring sliding on and turning with the axle and engaging the inner ends of said clutch members and a cup-shape sliding actuating member inclosing the said cam ring and provided with retaining devices engaging the cam ring.

4. In a motor vehicle, the combination with a driving axle and the ground wheels loosely mounted thereon, a clutch sleeve fixed to said axle adjacent each of the wheels, clutch shoes pivoted to the wheels and surrounding the clutch sleeve, a finger extending from each of the shoes, and a cam-ring carried by said axle and adapted to be moved into engagement with said fingers for moving the shoes into contact with their respective clutch sleeves.

5. In a motor vehicle, the combination with a driving axle and the ground wheels mounted thereon, a clutch sleeve fixed to said axle adjacent each of the wheels, pivoted clutch shoes carried by the wheels and surrounding each of the sleeves, fingers secured to said clutch shoes and extending therefrom in a direction substantially parallel with the driving axle, a rotating cam-ring loosely mounted on the axle and adapted to be brought into engagement with the fingers for moving the shoes into contact with their respective clutch sleeves, and a sliding member carried by the axle and connected to the cam-ring for operating the same.

6. In a motor vehicle, the combination with a driving axle and the ground wheels mounted thereon, a clutch sleeve fixed to said axle adjacent each of the wheels, pivoted clutch shoes carried by the wheels and surrounding each of the sleeves, fingers secured to said clutch shoes and extending therefrom in a direction substantially parallel with the driving axle, a rotating cam-ring loosely mounted on the axle and adapted to be brought into engagement with the fingers for moving the shoes into contact with their respective clutch sleeves, a sliding member carried by the axle and connected to the cam-ring for operating the same, and lever operating mechanism controlled from the forward part of the vehicle for giving the cam-ring and the member connected thereto a sliding movement.

7. In a motor vehicle, the combination with a driving axle and the ground wheels loosely mounted thereon, a clutch sleeve fixed to said axle adjacent each of the wheels, clutch shoes pivoted to the wheels and surrounding the clutch sleeve, fingers extending from each of the shoes, said fingers having journaled on their outer ends anti-friction rollers, and a cam-ring carried by said axle and adapted to be moved into engagement with said anti-friction rollers for moving the shoes into contact with their respective clutch sleeves.

8. In a motor vehicle, the combination with a driving axle and ground wheels loosely mounted thereon, a clutch sleeve fixed to said axle adjacent each wheel, clutch shoes pivoted to the wheels and having a serrated bearing face, and means on said axle engaging the free ends of said shoes for moving them inwardly into contact with their respective clutch sleeves.

9. In a motor vehicle, the combination with a driving axle and the ground wheels loosely mounted thereon, a clutch sleeve fixed to said axle adjacent each wheel, clutch shoes carried by the wheels, means on said axle for moving said shoes into contact with their respective clutch sleeves, and a spring carried by each of said shoes and adapted to be depressed during the clutching operation whereby it is adapted to serve as a releasing means for the clutch.

In testimony whereof I affix my signature, in presence of two witnesses.

ROBERT HENRY BOWMAN.

Witnesses:
G. D. SHAEFFER,
M. H. McQUOWN.